US011023791B2

(12) United States Patent
Chang et al.

(10) Patent No.: US 11,023,791 B2
(45) Date of Patent: Jun. 1, 2021

(54) COLOR CONVERSION USING NEURAL NETWORKS

(71) Applicant: KYOCERA DOCUMENT SOLUTIONS INC., Osaka (JP)

(72) Inventors: Michael M. Chang, El Segundo, CA (US); Alexander Daniel Friedman, Los Angeles, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/668,134

(22) Filed: Oct. 30, 2019

(65) Prior Publication Data

US 2021/0133522 A1 May 6, 2021

(51) Int. Cl.
| | |
|---|---|
| *G06K 15/02* | (2006.01) |
| *G06F 16/22* | (2019.01) |
| *G06N 3/08* | (2006.01) |
| *G06N 3/04* | (2006.01) |

(52) U.S. Cl.
CPC ..... *G06K 15/1868* (2013.01); *G06F 16/2282* (2019.01); *G06K 15/1861* (2013.01); *G06K 15/1878* (2013.01); *G06N 3/04* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 5,386,496 A | 1/1995 | Arai et al. | |
| 5,808,621 A | 9/1998 | Sundaresan | |
| 5,978,107 A | 11/1999 | Murai et al. | |
| 6,480,299 B1 | 11/2002 | Drakopoulos et al. | |
| 7,652,789 B2* | 1/2010 | Berns | H04N 1/6033 345/598 |
| 7,706,604 B2* | 4/2010 | Berns | H04N 1/6033 358/518 |
| 8,218,865 B2 | 7/2012 | Halkin | |
| 10,869,036 B2* | 12/2020 | Coelho | H04N 19/147 |
| 2002/0029715 A1* | 3/2002 | Ogatsu | B41F 27/1206 101/494 |
| 2007/0229574 A1* | 10/2007 | Kaneko | H04N 1/00087 347/19 |

(Continued)

*Primary Examiner* — Anh-Vinh T Nguyen
(74) *Attorney, Agent, or Firm* — GrowIP Law Group LLC (57) ABSTRACT

An example system includes a processor and a non-transitory computer-readable medium having stored therein instructions that are executable to cause the system to perform various functions. The functions include obtaining a source profile associated with a print job and a destination profile associated with the print job. The functions also include, based on the source profile and the destination profile, generating a color conversion object that maps input colors of a source color space to output colors of a destination color space. In addition, the functions include training a neural network using the color conversion object so as to obtain weights associated with two or more hidden layers of nodes of the neural network. Further, the functions include receiving color data corresponding to pixels of the print job, and converting the color data from the source color space to the destination color space using the neural network.

12 Claims, 5 Drawing Sheets

(56) References Cited

U.S. PATENT DOCUMENTS

| | | | |
|---|---|---|---|
| 2007/0291312 A1* | 12/2007 | Kaneko | H04N 1/6033 358/2.1 |
| 2008/0240605 A1* | 10/2008 | Enjuji | H04N 5/243 382/274 |
| 2010/0201997 A1 | 8/2010 | Has | |
| 2012/0105882 A1* | 5/2012 | Horita | H04N 1/6033 358/1.9 |
| 2012/0218574 A1* | 8/2012 | Fukuda | H04N 1/6097 358/1.9 |
| 2012/0224199 A1* | 9/2012 | Fukuda | H04N 1/6097 358/1.9 |
| 2012/0243011 A1* | 9/2012 | Fukuda | G06F 15/00 358/1.9 |
| 2012/0320393 A1* | 12/2012 | Ito | H04N 1/54 358/1.9 |
| 2016/0360072 A1* | 12/2016 | Inamura | H04N 1/603 |
| 2017/0061625 A1* | 3/2017 | Estrada | G06N 3/08 |
| 2017/0083762 A1* | 3/2017 | Segalovitz | G06K 9/00463 |
| 2018/0196587 A1* | 7/2018 | Bialynicka-Birula | G06T 3/0093 |
| 2018/0252514 A1* | 9/2018 | Pandev | G06T 7/001 |
| 2018/0349757 A1* | 12/2018 | Ando | G06N 3/04 |
| 2019/0102840 A1* | 4/2019 | Perl | B60W 40/09 |
| 2019/0228264 A1* | 7/2019 | Huang | G06K 9/6257 |
| 2020/0379133 A1* | 12/2020 | Burr | G01T 1/2921 |
| 2020/0405148 A1* | 12/2020 | Tran | A61B 3/0016 |

* cited by examiner

COLOR CONVERSION USING NEURAL NETWORKS

BACKGROUND

A first device, such as a computer monitor, may represent colors using a first color space, while a second device, such as a color printer, may represent colors using a second color space. To reproduce colors from the first device on the second device, the second device (or an intermediate device) can convert colors of the first color space to colors of the second color space using a process referred to as color conversion.

Certain color conversions, such as from a red, green, and blue (RGB) color space of a monitor to a device-independent color space (such as the XYZ color space or L*a*B* color space) are governed by well-defined mathematical equations. However, other color conversions, such as from the L*a*B* color space to the cyan, magenta, yellow, and black (CMYK) color space do not have well-defined mathematical equations. For color conversions without well-defined mathematical equations, lookup tables (LUTs) can be used to capture local empirical correspondences.

By way of example, to convert from the L*a*b* color space to the CMYK color space, a three-dimensional LUT (3D-LUT) can be used. In the L*a*b* color space, colors are expressed using three components: an L* component, an a* component, and a b* component. Each of these components is represented by an 8-bit integer, and there are 256 possible values of each component. A complete 3D-LUT for the color conversion would therefore include 256-by-256-by-256 inputs, and a corresponding 4-byte CMYK output for each input.

To reduce the size of a LUT, a sparse grid and interpolation can be used. For instance, instead of storing output values for all 16,777,216 ($256^3$) input values of the L*a*b* color space, a 3D-LUT may include output values for color values of a 17-by-17-by-17 sparse grid that spans the L*a*b* color space. This reduces the number of input values from over 16 million to just 4,913. During color conversion, if an input color value is not stored in the 3D-LUT, 3D interpolation can be used to determine an output value corresponding to the input color value.

For comparison, the size of a 3D-LUT for converting from the L*a*b* color space to the CMYK that includes output colors for 16,777,216 input values is over 67 megabytes. Whereas, the size of a similar 3D-LUT that is derived from a 17-by-17-by-17 sparse grid color space is approximately 19 kilobytes.

For mapping CMYK to L*a*b*, a four-dimensional LUT (4D-LUT) can be used. The size of a 4D-LUT derived from a 17-by-17-by-17-by-17 sparse grid is approximately 250 kilobytes. Further, some devices use color spaces having more than four components. For instance, extended color gamut (ECG) printers use the cyan, magenta, yellow, black, orange, green, and violet (CMYKOGV) color space, a seven-component color space. The size of a 7D-LUT for a 17-by-17-by-17-by-17-by-17-by-17-by-17 sparse grid is approximately 1.2 gigabytes.

The size and configuration of the LUTs of a printing system can influence printing speed, printing quality (e.g. accuracy of color reproduction and transitions), and cost (e.g. memory size and type). Using a LUT that is derived from a sparse grid in place of a more robust LUT can reduce the size of the LUT and save on memory consumption and processing time. However, converting colors using a LUT that is derived from a sparse grid rather than a more robust LUT can compromise the accuracy of the color conversion. Improvements are therefore desired.

SUMMARY

In one example, a system is described. The system includes a processor and a non-transitory computer-readable medium having stored therein instructions that are executable to cause the system to perform various functions. The functions include obtaining a source profile associated with a print job, and obtaining a destination profile associated with the print job. The functions also include, based on the source profile and the destination profile, generating a color conversion object that maps input colors of a source color space to output colors of a destination color space. In addition, the functions include training a neural network using the color conversion object so as to obtain weights associated with two or more hidden layers of nodes of the neural network. Further, the functions include receiving color data corresponding to pixels of the print job, and converting the color data from the source color space to the destination color space using the neural network.

In another example, a method is described. The method includes obtaining a source profile associated with a print job, and obtaining a destination profile associated with the print job. The method also includes, based on the source profile and the destination profile, generating a color conversion object that maps input colors of a source color space to output colors of a destination color space. Additionally the method includes training a neural network using the color conversion object so as to obtain weights associated with two or more hidden layers of nodes of the neural network. Further, the method includes receiving, by a processor, color data corresponding to pixels of the print job. Still further, the method includes converting, by the processor, the color data from the source color space to the destination color space using the neural network.

In another example, a non-transitory computer-readable medium is described. The non-transitory computer-readable medium has stored therein instructions that are executable to cause a system to perform functions. The functions include obtaining a source profile associated with a print job, and obtaining a destination profile associated with the print job. The functions also include, based on the source profile and the destination profile, generating a color conversion object that maps input colors of a source color space to output colors of a destination color space. In addition, the functions include training a neural network using the color conversion object so as to obtain weights associated with two or more hidden layers of nodes of the neural network. Further, the functions include receiving color data corresponding to pixels of the print job, and converting the color data from the source color space to the destination color space using the neural network.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Some printing systems include a color management module (CMM) that performs color conversions. The CMM can be a software module embedded into the operating system of a computing device. The CMM can receive a print job, and convert colors from a source color space of a source device to a destination color space of a destination device.

By way of example, to perform a color conversion, the CMM can extract or derive information from a data structure known as a source profile of the source device. The source profile can be an International Color Consortium (ICC) profile that is structured in accordance with the ICC standard. The source profile can map colors of the source color space to colors of a device-independent color space (such as the L*a*b* color space).

Similarly, the CMM can extract or derive information from a destination profile of the destination device. The destination profile can map colors from the device-independent color space to a destination color space of the destination device. The CMM can then build a color conversion object using the information that is extracted from the source profile and the device profile. For instance, the color conversion object can include a one-step multi-dimensional LUT that converts colors from the source color space to the destination color space.

In production printing, a page of a print job may include multiple different objects that have different source profiles. For instance, a page can include an image that is defined in an RGB color space, and include a chart made up of geometric elements that are defined in a CMYK color space. To print this page, a CMM may construct two different color conversion objects such as: a first LUT for converting from the RGB color space to a color space of a printer; and a second LUT for converting from the CMYK color space to the color space of the printer.

Further, for some print jobs, different pages of a print job may include different respective source profiles that describe intended color appearances. Accordingly, for some print jobs, a CMM may construct different color conversion objects for different pages.

While processing a print job, the CMM may store in memory any color conversion objects that are constructed in connection with handling the print job. As noted above, to improve color accuracy, it may be desirable to use a larger LUT that maps more input values directly to output values as compared to a smaller LUT that maps fewer input values directly to output values than the larger LUT. For instance, for a CMYK to CMYK color conversion, a LUT that is derived from a 33×33×33×33 sparse grid may provide a more accurate conversion than a LUT that is derived from a 17×17×17×17 sparse grid. Unfortunately, however, generating, storing, and using a larger LUT may consume more computing resources, such as processing power and memory storage, as compared to generating, storing, and using a smaller LUT. Therefore, to save on memory and processing overhead, smaller LUTs (such as LUTs that are derived from a 9×9×9×9 sparse grid) are more attractive than larger LUTs (such as LUTs that are derived from a 17×17×17×17 sparse grid).

As more printers and devices switch to higher-dimension color spaces, such as the CMYKOGV color space, the color conversion objects created by a CMM may become increasingly larger in size. Hence, the need to optimize the use of memory and processing resources during color conversion is becoming increasingly important.

In order to address this and potentially other goals, described herein are computer implementations for performing color conversion using neural networks. Advantageously, by using a neural network to perform color conversion, similar accuracy to that of a larger color conversion LUT can be achieved, while utilizing significantly less memory and processing resources. For instance, one thousand floating point parameters of a neural network that is usable for color conversion from a four-dimensional color space to a three-dimensional color space can be stored using just a few kilobytes of data. Whereas, the size of a 4D-LUT derived from a 17-by-17-by-17-by-17 sparse grid is approximately 250 kilobytes. In other words, using the neural network in place of the LUT reduces the amount of memory resources consumed by several orders of magnitude. For neural networks having fewer than one thousand parameters or having weights that are represented using fixed point numbers rather than floating point numbers, the potential memory savings are even larger.

In an example method, a computing system can obtain a pair of source and destination profiles associated with a print job. The computing system can then generate a color conversion object, such as a LUT, by merging the source profile and the destination profile. Further, the computing system can train a neural network using the color conversion object. As an example, the computing system can train the neural network using inputs and outputs of the color conversion object, so as to obtain weights associated with two or more hidden layers of nodes of the neural network.

After training the neural network, the computing system can discard the color conversion object from memory, and use the neural network to preform color conversion. For instance, the computing system can receive color data corresponding to pixels of a print job, and convert the color data from the source color space to the destination color space using the neural network. In other words, the neural network can be a run-time instantiation of a CMM.

In some examples, the ability to discard a color conversion object after training the neural network can free-up memory resources during color conversion. For instance, for a print job that includes multiple source color spaces, the CMM can temporarily store a first color conversion object, train a first neural network, discard the first color conversion object, and then proceed to generate a second color conversion object, and train a second neural network. In other words, the CMM might not need to store both the first color conversion object and the second color conversion object at the same time. This advantage of the disclosed method is advantageous for complex print jobs that include more than two source color spaces and for print jobs that involve higher-dimension color spaces, such as seven-component color spaces.

In some examples, training a neural network using a color conversion object can involve training the neural network using one or more interpolation schemes. For instance, given a LUT, a computing system can produce a training set using both the inputs and outputs of the LUT as well as inputs and outputs given by one or more interpolation schemes. Using interpolation can increase the robustness of the training set. Additionally, the neural network can include one or more control nodes that allow the neural network to specify whether interpolation was used and, if so, to select an interpolation scheme from among a plurality of interpolation schemes. This can improve the accuracy of the weights of the neural network, and lead to more accurate color conversions.

Various other features of the example method discussed above, as well as other methods and systems, are described hereinafter with reference to the accompanying figures.

Figure 1:
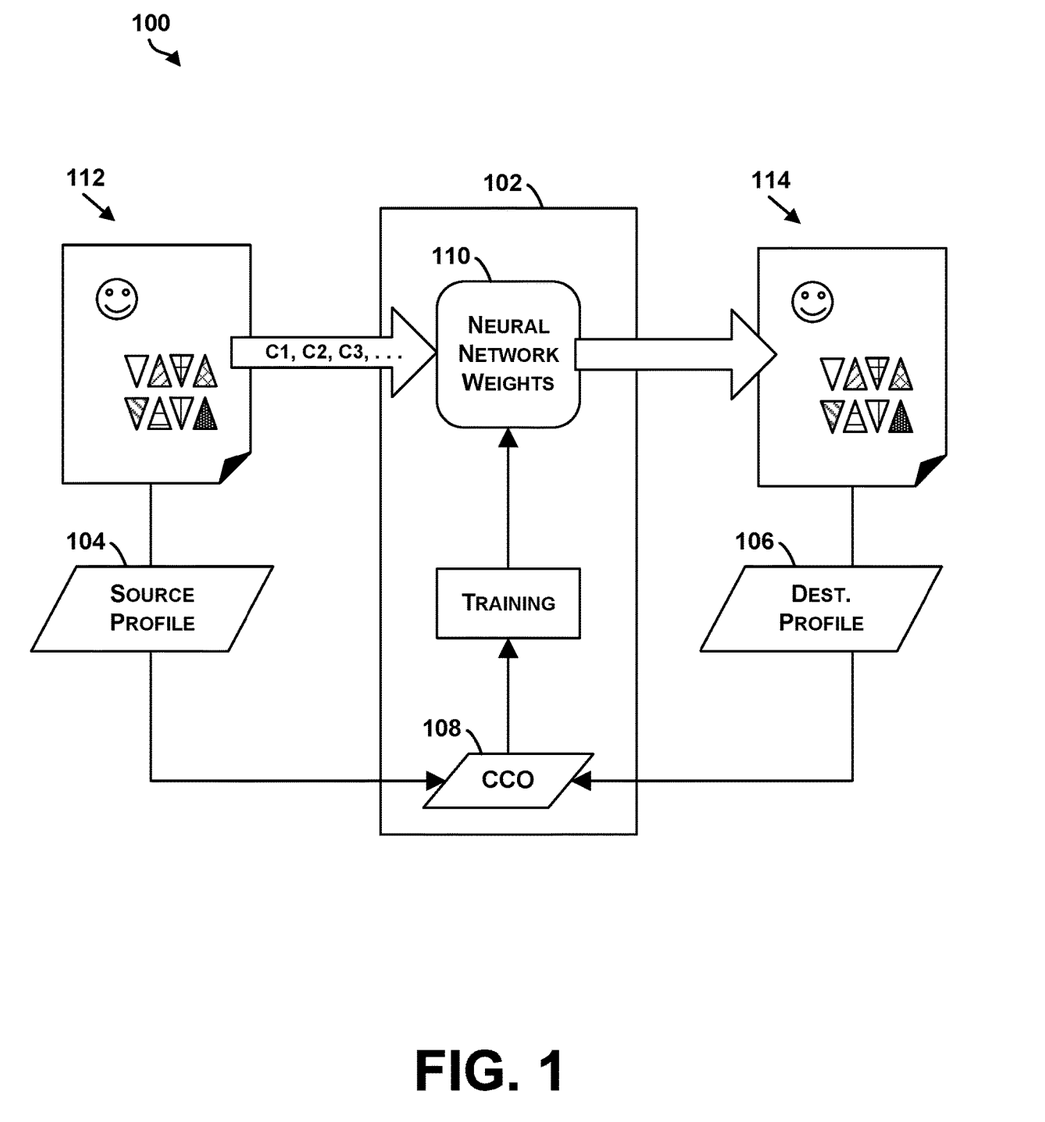
FIG. 1 conceptually illustrates an example system, according to an example embodiment.

Referring now to the figures, FIG. 1 is a conceptual illustration of an example system 100. In line with the discussion above, system 100 may be used to perform color conversion for a print job or to generate weights of a neural network that can be utilized for color conversion. As shown in FIG. 1, system 100 includes a computing device 102 that can obtain a source profile 104 associated with a print job and a destination profile 106 associated with the print job, can utilize the source profile 104 and the destination profile 106 to generate a color conversion object 108, and can use the color conversion object 108 to learn neural network weights 110. Further, computing device 102, or another computing device of system 100, can then use these neural network weights 110 to perform color conversion from a source color space 112 to a destination color space 114.

Computing device 102 could be any type of computing device, such as a mobile phone, tablet computer, wearable computer, desktop computer, laptop computer, etc. Computing device 102 can include a processor, and a non-transitory computer-readable medium having stored therein instructions that are executable to cause computing device 102 to perform the computing device functions described herein.

For instance, the non-transitory computer-readable medium could store instructions that are executable to cause computing device 102 to: obtaining source profile 104 and destination profile 106; generate color conversion object 108 based on source profile 104 and destination profile 106; and train a neural network using color conversion object 108 so as to obtain neural network weights 110. Additionally or alternatively, the non-transitory computer-readable medium could store instructions that are executable to cause computing device 102 to receive color data corresponding to pixels of a print job, and convert the color data from the source color space to the destination color space using the neural network.

In line with the discussion above, source profile 104 can include data for mapping input colors from source color space 112 to a device-independent color space. As one example, source profile 104 can include an ICC profile that stores one or more LUTs, such as a LUT for mapping input colors of source color space 112 to the L*a*b* color space or to the XYZ color space. Alternatively, source profile 104 can include one or more equations for mapping input colors of source color space 112 to the L*a*b* color space or to the XYZ color space. Computing device 102 can extract a LUT or equations from source profile 104 for use in generating color conversion object 108. Source color space 112 can be a color space of a source device, such as a computer monitor. Examples of source color space 112 include an RGB color space, a CMYK color space, and a CMYKOGV color space. Other examples are also possible.

Similarly, destination profile 106 can include data for mapping colors of a device-independent color space to colors of destination color space 114. Destination profile 106 can include an ICC profile or similar data structure that stores one or more LUTs, such as a LUT for mapping colors from the L*a*b* color space to destination color space 114 or for mapping colors from the XYZ color space to destination color space 114. Alternatively, destination profile 106 can include one or more equations for mapping colors of a device-independent color space to destination color space 114. Computing device 102 can extract a LUT or equations from destination profile 106 for use in generating color conversion object 108. Destination color space 114 can be a color space of a destination device, such as a printer (e.g., a digital inkjet printer). Examples of destination color space 114 include an RGB color space, a CMYK color space, and a CMYKOGV color space. Other examples are also possible.

Further in line with the discussion above, computing device 102 can merge data extracted from source profile 104 and destination profile 106 to generate color conversion object 108. By way of example, computing device 102 can merge a LUT of source profile 104 with a LUT of destination profile 106 in order to generate a one-step LUT. The LUT of source profile 104 can map colors of source color space 112 to colors of a device-independent color space, and the LUT of destination profile 106 can map colors of the device-independent color space (or another device-independent color space) to colors of destination color space 114. To create an entry of the LUT of color conversion object 108, for a given input color specified within the LUT of source profile 104, computing device 102 can (i) map the input color to a color within the device-independent color space using the LUT of source profile 104, (ii) map the color within the device-independent color space to an output color of destination color space 114 using the LUT of destination profile 106, and (iii) associate the output color with the input color in the LUT of color conversion object 108. If the LUT of source profile 104 maps the input color to a color of the device-independent color space that is not represented in the LUT of destination profile, computing device 102 can determine the output color by applying an interpolation scheme to the data of the LUT of destination profile 106. Examples of interpolation schemes include a linear interpolation scheme, a bilinear interpolation scheme, a cubic interpolation scheme, a bicubic interpolation scheme, and a tetrahedral interpolation scheme, for instance.

In some examples, the LUT of source profile 104 may map colors from source color space 112 to a first device-independent color space, and the LUT of destination profile 106 may map colors from a second device-independent color space to destination color space 114, with the second device-independent color space being different from the first device-independent color space. In this scenario, generating the LUT of color conversion object 108 may involve converting colors from the first device-independent color space to the second device-independent color space.

Color conversion object can therefore include a data structure, such as a multi-dimensional LUT, that maps input colors of source color space 112 to output colors of destination color space 114. As an example, color conversion object 108 can include a 3D-LUT that maps colors of an RGB color space to colors of a CMYK color space. As another example, color conversion object 108 can include a 4D-LUT that maps colors of a first CMYK color space to colors of a second CMYK color space. As another example, color conversion object can include a 7D-LUT that maps colors of a CMYKOGV color space to colors of a CMYK color space. Other examples are also possible. Color conversion object 108 can be temporarily stored in memory, such as a memory of computing device 102, until neural network weights 110 are learned.

After generating color conversion object 108, computing device 102 (or another computing device of system 100) can train a neural network using color conversion object 108 so as to obtain neural network weights 110. Since color conversion object 108 maps input colors of source color space 112 to output colors of destination color space 114, pairs of input colors and output colors of color conversion object 108 can be used as a training set for the neural network.

In some examples, additional pairs of color values can be generated for the training set using one or more interpolation schemes. For instance, computing device 102 can generate an input color that is different from the input colors of color conversion object 108, determine an interpolated output color corresponding to the input color using interpolation, associate the interpolated output color with the input color, and add the input color and the interpolated output color to the training set.

The neural network can be an artificial neural network and can take many forms. An example neural network can include an input layer, one or more hidden layers of nodes, and an output layer. The input layer can include a plurality of input nodes, and input nodes of the plurality of input nodes can correspond to respective components of source color space 112. Further, in examples in which the training set includes interpolated data, the input layer can include control nodes that allow the neural network to select an interpolation scheme from among a plurality of interpolation schemes. The output layer can include a plurality of output nodes, and output nodes of the plurality of output nodes can correspond to respective components of destination color space 114. The plurality of input nodes can be connected to nodes of the hidden layers of nodes, which are in turn connected to the plurality of output nodes. Edges between nodes of the neural network can be assigned respective weights that represent the edge's relative importance. These weights together form the neural network weights 110.

During training of the neural network, computing device 102 can learn the neural network weights 110 by adjusting the neural network weights 110 to improve the accuracy of the neural network. The accuracy of the neural network can be evaluated based on the ability of the neural network to map input colors of the training set to corresponding output colors of the training set. Training the neural network can be accomplished by minimizing observed errors, which can be quantified using a cost function. One method for adjusting weights during the training is backpropagation of errors. Other techniques can also be used.

After training the neural network and learning the neural network weights 110, computing device 102 (or another computing device of system 100) can use the neural network to perform color conversion. Hence, color conversion object 108 can be deleted from the memory where color conversion object 108 is stored, thereby free-up memory resources of system 100. To perform color conversion, computing device 102 can receive color data corresponding to pixels of a print job, and convert the color data from source color space 112 to destination color space 114 using the neural network. This conversion can involve providing the color data as input to the neural network, and determining an output color based on an output of the neural network as dictated by the neural network weights 110.

Figure 2:
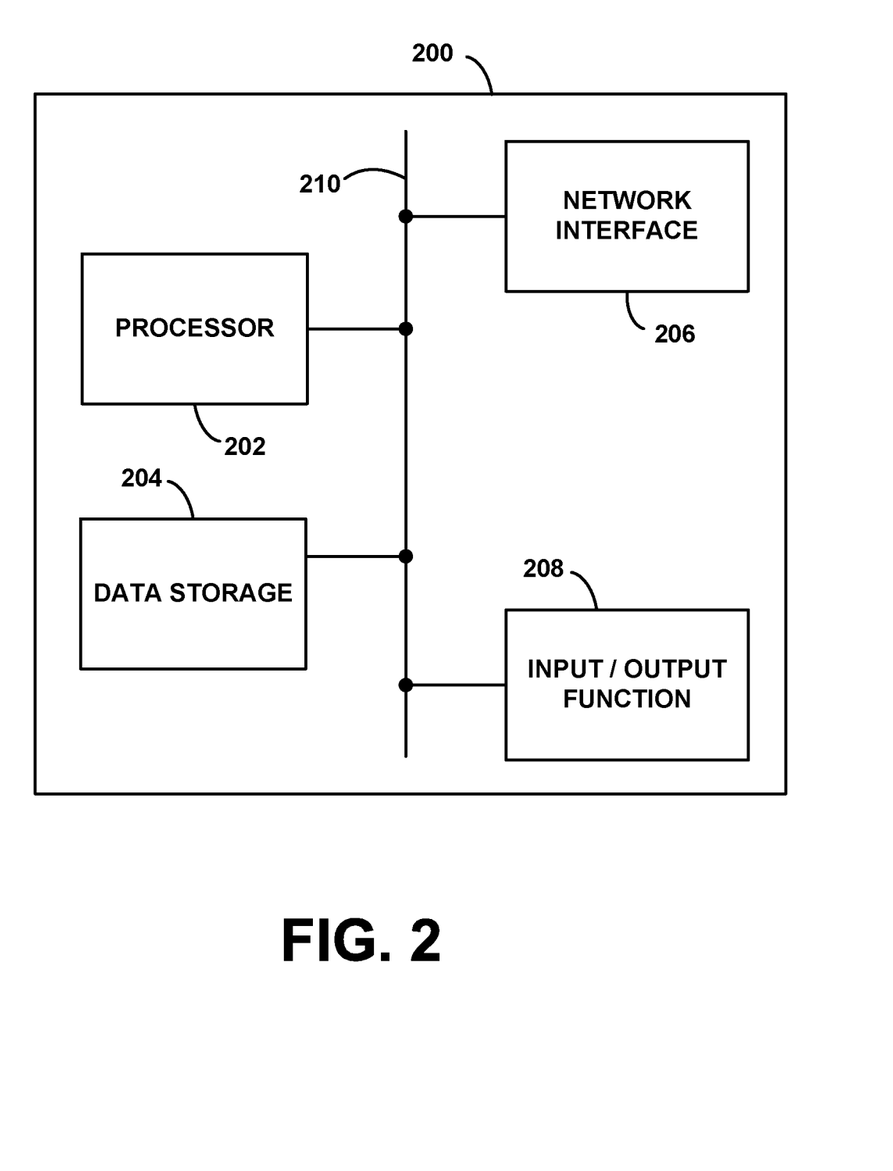
FIG. 2 illustrates an example computing device, according to an example embodiment.

FIG. 2 illustrates an example computing device 200, according to an example embodiment. FIG. 2 illustrates one or more of the functional elements that may be found in a device arranged to operate in accordance with the embodiments herein, such as computing device 102 of FIG. 1.

Computing device 200 may include a processor 202, data storage 204, network interface 206, and input/output function 208, all of which may be coupled by a system bus 210 or a similar mechanism. Processor 202 may include one or more central processing units (CPUs), such as one or more general purpose processors and/or one or more dedicated processors (e.g., application specific integrated circuits also known as ASICs or digital signal processors also known as DSPs, etc.).

Data storage 204, in turn, may comprise volatile and/or non-volatile data storage and can be integrated in whole or in part with processor 202. Data storage 204 may store program instructions, executable by processor 202, and data that are manipulated by these instructions to carry out the various methods, processes, or functions described herein. Alternatively, these methods, processes, or functions can be defined by hardware, firmware, and/or any combination of hardware, firmware and software. Therefore, data storage 204 may include a tangible, non-transitory computer-readable medium, having stored thereon program instructions that, upon execution by one or more processors, cause computing device 200 to carry out any of the methods, processes, or functions disclosed in this specification or the accompanying drawings.

Network interface 206 may take the form of a wire line connection, such as an Ethernet, Token Ring, or T-carrier connection. Network interface 206 may alternatively take the form of a wireless connection, such as WiFi, BLUETOOTH®, or a wide-area wireless connection. However, other forms of physical layer connections and other types of standard or proprietary communication protocols may be used over network interface 206. Furthermore, network interface 206 may comprise multiple physical communication interfaces.

Input/output function 208 may facilitate user interaction with example computing device 200. Input/output function 208 may comprise multiple types of input devices, such as a keyboard, a mouse, a touch screen, a microphone and/or any other device that is capable of receiving input from a user. Similarly, input/output function 208 may comprise multiple types of output devices, such as a display, printer, one or more light emitting diodes (LEDs), speaker, or any other device that is capable of providing output discernible to a user. Additionally or alternatively, example computing device 200 may support remote access from another device, via network interface 206 or via another interface (not shown), such as an RS-132 or Universal Serial Bus (USB) port.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

Figure 3:
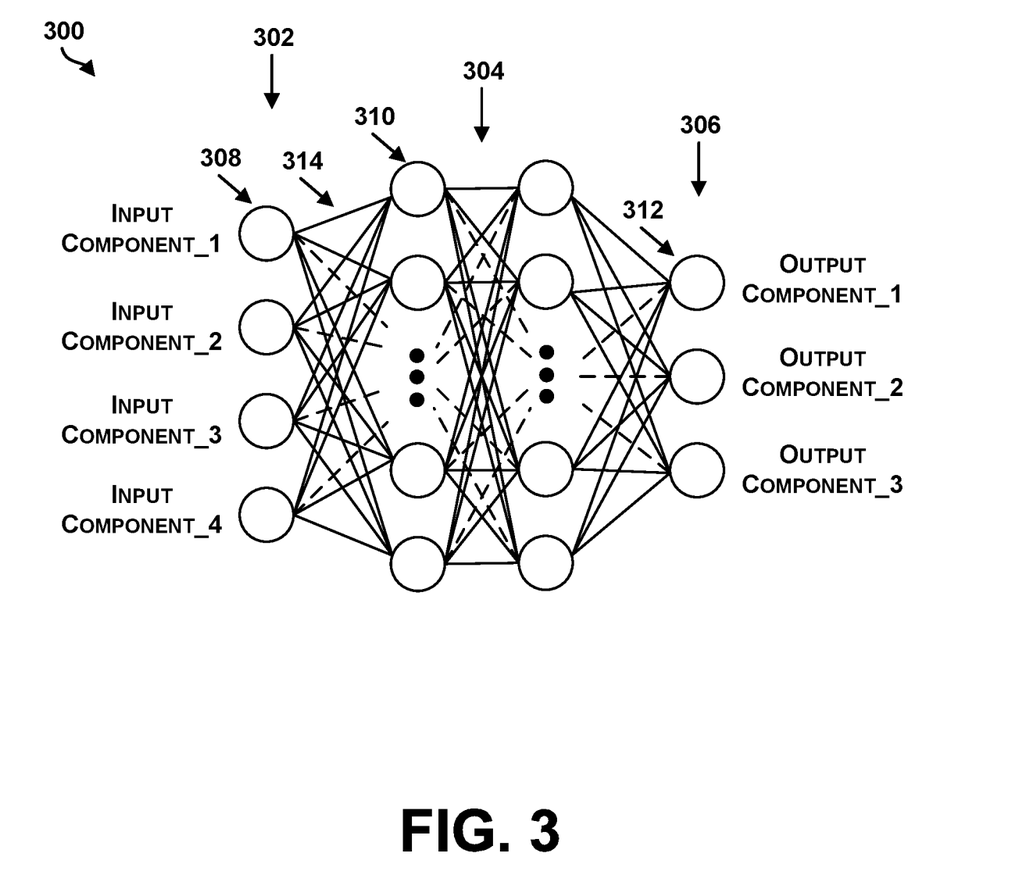
FIG. 3 is a conceptual illustration of a neural network, according to an example embodiment.

FIG. 3 is a conceptual illustration of a neural network 300, according to an example embodiment. Neural network 300 is an example of a neural network that one or more computing devices can train using a color conversion object, such as color conversion object 108 of FIG. 1, and/or can use to convert color data from a source color space to a destination color space.

As shown in FIG. 3, neural network 300 includes a plurality of input nodes 302, a plurality of hidden layers of nodes 304, and a plurality of output nodes 306. Plurality of input nodes 302 includes four input nodes 308 corresponding to four respective input components of a source color space. For instance, the source color space can be a CMYK color space, such that each input node 308 corresponds to a respective one of the four components of the CMYK color space. The number of input nodes 308 in plurality of input nodes 302 corresponds to the number of components in the source color space. Accordingly, in examples where the source color space includes more or fewer than four components, plurality of input nodes 302 can include more or fewer input nodes 308.

Plurality of hidden layers of nodes 304 includes two hidden layers of hidden nodes 310. The number of hidden nodes 310 per hidden layer can vary. In one example, each hidden layer can include thirty hidden nodes 310. Alternatively, each hidden layer can include less than thirty hidden nodes, such as fifteen hidden nodes, or twenty hidden nodes. Further, in some instances, plurality of hidden layers of nodes 304 can include more than two hidden layers of hidden nodes 310, such as three hidden layers, five hidden layers, etc.

Plurality of output nodes 306 includes three output nodes 312 corresponding to three respective output components of a destination color space. For instance, the destination color space can be an RGB color space, such that each output node 312 corresponds to a respective one of the three components of the RGB color space. The number of output nodes 312 in plurality of output nodes 306 corresponds to the number of components in the destination color space. Accordingly, in examples, where the destination color space includes more or fewer than three components, plurality of output nodes 306 can include more or fewer output nodes 312.

Each input node 308 is connected to each hidden node 310 of a first hidden layer by an edge 314. Further, each hidden node 310 of the first hidden layer of plurality of hidden nodes 304 is connected to each hidden node 310 of a second hidden layer of hidden nodes 310 by an edge 314. Still further, each hidden node 310 of the second hidden layer of hidden nodes 310 is connected to each output node 312 by an edge 314.

Each edge 314 has an associated weight that can be learned using a training process. For example, initial weights for the edges 314 can be chosen randomly by a computing device. The computing device can then obtain a training set of inputs and corresponding outputs. The neural network can then process the inputs and compare the resulting outputs against the desired outputs indicated by the training set. Further, the computing device can propagate errors backwards through the neural network, causing the computing device to adjust the weights associated with the edges 314. This process can then be repeated many times, with the weights associated with the edges 314 being continually refined until a statistically desired point or accuracy is reached. Other training processes can also be used. Hence, the example is not meant to be limiting.

After training neural network 300 and learning the weights associated with the edges 314, a computing device can use the neural network for color conversion. By way of example, when an input value, such as a color vector of [65, 4, 37, 125], a computing device can determine an output value corresponding to each of the three output components using the four components of the input value, weights associated with the edges 314, and an activation function. Starting from the first hidden layer of hidden nodes 310, at each hidden node where edges connect to the hidden node from the left side, for each edge, a computing device can multiply the value for the previous node (i.e. the value for the input node on the left side of the edge) by the weight for the edge, and then sum all of these intermediate values together to arrive at a summation value. The computing device can then provide this summation value as input to an activation function, and determine a node value for the node based on an output of the activation function.

The computing device can repeat this process in a similar manner for each hidden node of the second hidden layer of hidden nodes 310. More specifically, at each hidden node where edges connect to the hidden node from the left side, for each edge, a computing device can multiply the value for the previous node (i.e. the value for the hidden node on the left side of the edge) by the weight for the edge, and then sum all of these intermediate values together to arrive at a summation value. The computing device can then provide this summation value as input to an activation function, and determine a node value for the node based on an output of the activation function.

Further, the computing device can repeat this process again for each output node 312. In particular, at each output node where edges connect to the output node from the left side, for each edge, a computing device can multiply the value for the previous node (i.e. the value for the hidden node on the left side of the edge) by the weight for the edge, and then sum all of these intermediate values together to arrive at a summation value. The computing device can then provide this summation value as input to an activation function, and determine a node value for the node based on an output of the activation function.

As a result, the computing device can use neural network 300 to determine an output value corresponding to the input value. For instance, for the input color vector of [65, 4, 37, 2], the computing device may determine an output value of 87 for a first output node, an output value of 240 for a second output node, and an output value of 157 for a third output node, yielding an output color vector of [87, 240, 157].

Figure 4:
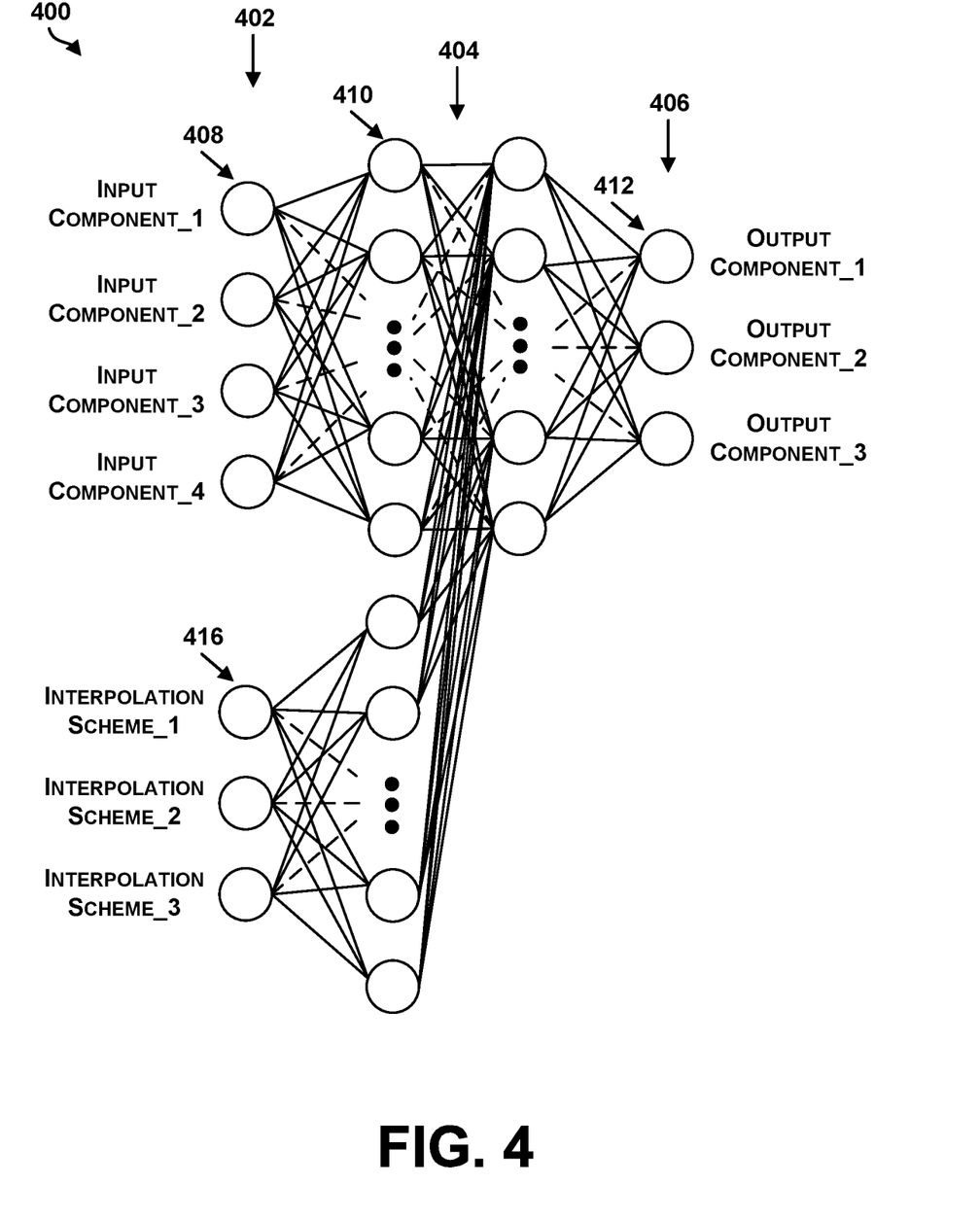
FIG. 4 is a conceptual illustration of another neural network, according to an example embodiment.

FIG. 4 is a conceptual illustration of another neural network 400, according to an example embodiment. Neural network 400 is another example of a neural network that one or more computing devices can train using a color conversion object, such as color conversion object 108 of FIG. 1, and/or can use to convert color data from a source color space to a destination color space.

As shown in FIG. 4, like neural network 300 of FIG. 3, neural network 400 includes a plurality of input nodes 402, a plurality of hidden layers of nodes 404, and a plurality of output nodes 406. Further, plurality of input nodes 402 includes four input nodes 408 corresponding to four respective input components of a source color space, plurality of hidden layers of nodes 304 includes two hidden layers of hidden nodes 410, and plurality of output nodes 406 includes three output nodes 412 corresponding to three respective output components of a destination color space.

However, unlike neural network 300 of FIG. 3, in neural network 400, plurality of input nodes 402 also includes a plurality of control nodes 416. Although multiple control nodes 416 are shown, in other examples, a neural network may only include a single control node 416. These control nodes 416 can be used to change the behavior of neural network, and allow for selecting an interpolation scheme from among a plurality of interpolation schemes during training. For instance, a training set can include pairs of input colors and output colors that are directly extracted from a LUT of a color conversion object. In addition, the training set can include pairs of input colors and output colors that are generated using one or multiple interpolation schemes, such as linear interpolation, cubic interpolation, and/or tetrahedral interpolation. For pairs of input colors and output colors that are generated using an interpolation scheme, the training set can also include an identifier that is indicative of the interpolation scheme.

During training, a computing device can switch the control nodes 416 on using one-hot encoding for the pairs of input colors and output colors that were generated using interpolation. For instance, for input colors of the CMYK color space that are not generated using interpolation scheme, the computing device can represent these input colors with input values of [c, m, y, k, 0, 0, 0], with the first four values corresponding to the first four components of the CMYK color space, respectively, and the last three values corresponding to three respective interpolation schemes. Since the input values were not obtained using interpolation, the last three values are all zero.

On the other hand, for input colors that were generated using a first interpolation scheme, the computing device can represent these input colors with input values of [c, m, y, k, 1, 0, 0]. Similarly, for input colors that were generated using a second interpolation scheme, the computing device can represent these input colors with input values of [c, m, y, k, 0, 1, 0]. And for input colors that were generated using a third interpolation scheme, the computing device can represent these input colors with input values of [c, m, y, k, 0, 0, 1]. In this manner, during training of neural network 400, the weights of neural network 400 can be learned and refined in accordance with whether or not an interpolation scheme was used, and, if so, which interpolation scheme(s) was used to generate an input color/output color pair. Taking into consideration the interpolation scheme(s) used to generate the data of the training set can help to refine the weights of the neural network. Refining the weights can, in turn, help to improve color conversion accuracy when the neural network is used to perform color conversion.

Figure 5:
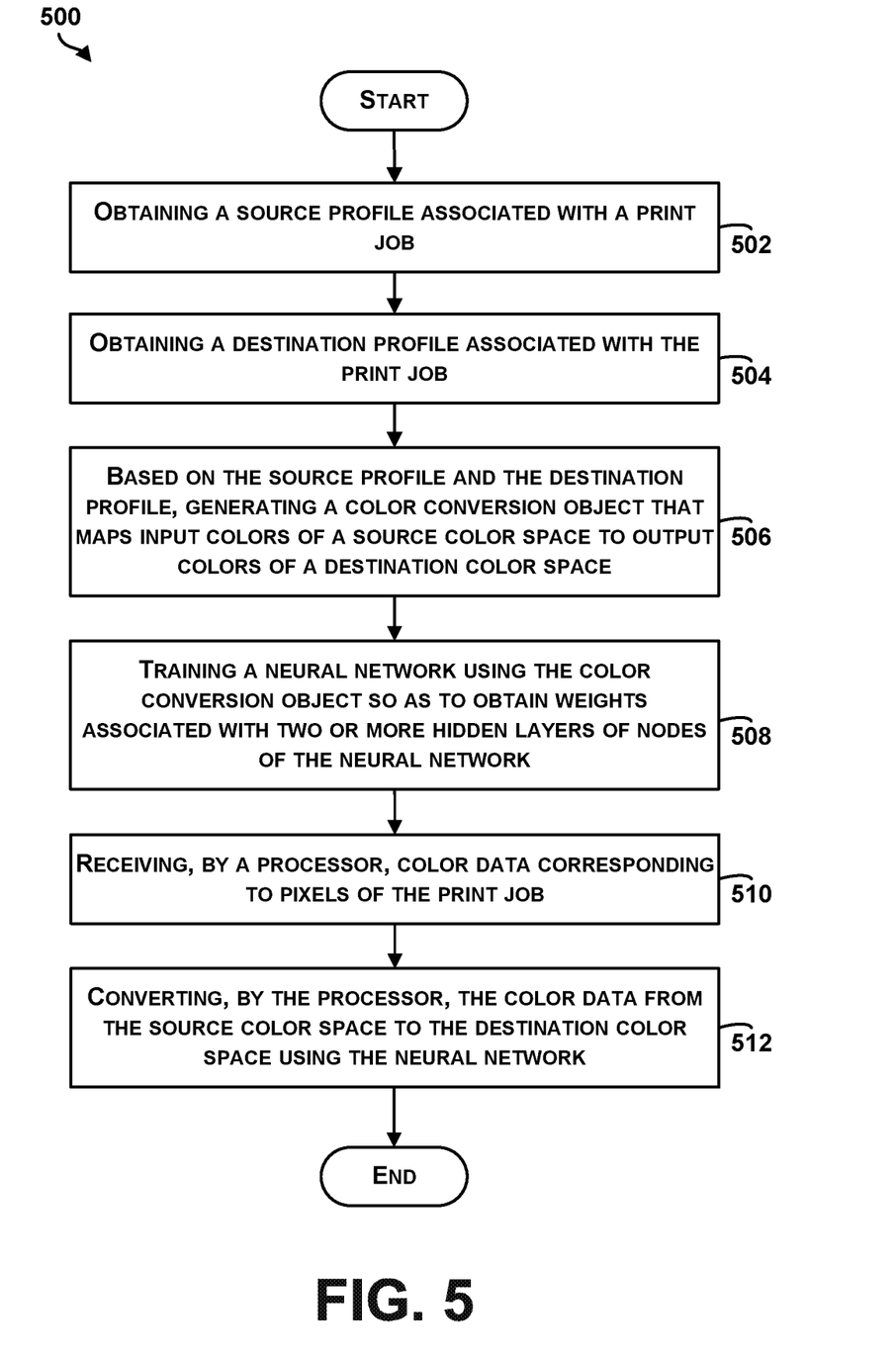
FIG. 5 shows a flowchart of an example method, according to an example embodiment.

FIG. 5 shows a flowchart of an example method 500, according to an example embodiment. Method 500 shown in FIG. 5 presents an embodiment of a method that, for example, could be used with the system shown in FIG. 1, for example, or any of the systems disclosed herein. For example, method 500 could be carried out by computing device 102 of FIG. 1 and/or could be carried out by other types of devices or device subsystems.

Method 500 may include one or more operations, functions, or actions as illustrated by one or more of blocks 502-512. Although these blocks are illustrated in a sequential order, these blocks may also be performed in parallel, and/or in a different other than those described herein. Also, the various blocks may be combined into fewer blocks, divided into additional blocks, and/or removed based upon the desired implementation.

Initially, at block 502, the method 500 includes, obtaining a source profile associated with a print job. At block 504, the method 500 includes obtaining a destination profile associated with the print job. At block 506, the method 500 includes, based on the source profile and the destination profile, generating a color conversion object that maps input colors of a source color space to output colors of a destination color space. At block 508, the method 500 includes training a neural network using the color conversion object so as to obtain weights associated with two or more hidden layers of nodes of the neural network. At block 510, the method 500 includes receiving, by a processor, color data corresponding to pixels of the print job. At block 512, the method 500 includes converting, by the processor, the color data from the source color space to the destination color space using the neural network.

In some examples, the color conversion object may include a LUT that maps the input colors of the source color space to the output colors of the destination color space. Additional blocks, not explicitly illustrated in FIG. 5, may therefore involve: (i) storing the LUT in a memory; and (ii) deleting the LUT from the memory after training the neural network.

In some examples, converting the color data using the neural network can include (i) providing individual color values of the color data as input to the neural network; and (ii) determining respective converted color values corresponding to the individual color values based on the weights associated with the two or more hidden layers of nodes.

Further, training the neural network can involve: (i) obtaining an input color that is different from the input colors that the color conversion object maps to output colors; (ii) determining an interpolated output color corresponding to the input color using interpolation; and (iii) training the neural network using a training set of data that includes the input color and the corresponding interpolated output color.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a processor; and
a non-transitory computer-readable medium having stored therein instructions that are executable to cause the system to perform functions comprising:
obtaining a source profile associated with a print job,
obtaining a destination profile associated with the print job,
based on the source profile and the destination profile, generating a color conversion object that maps input colors of a source color space to output colors of a destination color space,
training a neural network using the color conversion object so as to obtain weights associated with two or more hidden layers of nodes of the neural network, wherein the neural network comprises an input layer having a plurality of input nodes and an output layer having a plurality of output nodes, wherein input nodes of the plurality of input nodes correspond to respective components of the source color space, wherein output nodes of the plurality of output nodes correspond to respective components of the destination color space, and wherein training the neural network further composes:
obtaining an input color that is different from the input colors that the color conversion object maps to output colors, wherein the input layer further comprises control nodes that allow the neural network to select an interpolation scheme from among a plurality of interpolation schemes that include at least a linear interpolation scheme and a cubic interpolation scheme,
determining an interpolated output color corresponding to the input color using interpolation according to the interpolation scheme specified by the control nodes, and
training the neural network using a training set of data that includes the input color and the corresponding interpolated output color,
receiving color data corresponding to pixels of the print job, and
converting the color data from the source color space to the destination color space using the neural network.

2. The system of claim 1, wherein the color conversion object comprises a lookup table that maps the input colors of the source color space to the output colors of the destination color space.

3. The system of claim 2, wherein the functions further comprise:
storing the lookup table in a memory, and
deleting the lookup table from the memory after training the neural network.

4. The system of claim 1, wherein converting the color data using the neural network comprises:
providing individual color values of the color data as input to the neural network, and
determining respective converted color values corresponding to the individual color values based on the weights associated with the two or more hidden layers of nodes.

5. A method comprising:
obtaining a source profile associated with a print job,
obtaining a destination profile associated with the print job,
based on the source profile and the destination profile, generating a color conversion object that maps input colors of a source color space to output colors of a destination color space,
training a neural network using the color conversion object so as to obtain weights associated with two or more hidden layers of nodes of the neural network, wherein the neural network comprises an input layer having a plurality of input nodes and an output layer having a plurality of output nodes, wherein input nodes of the plurality of input nodes correspond to respective components of the source color space, wherein output nodes of the plurality of output nodes correspond to respective components of the destination color space, and wherein training the neural network further comprises:
obtaining an input color that is different from the input colors that the color conversion object maps to output colors, wherein the input layer further comprises control nodes that allow the neural network to select an interpolation scheme from among a plurality of interpolation schemes that include at least a linear interpolation scheme and a cubic interpolation scheme,
determining an interpolated output color corresponding to the input color using interpolation according to the interpolation scheme specified by the control nodes, and
training the neural network using a training set of data that includes the input color and corresponding interpolated output color,
receiving, by a processor, color data corresponding to pixels of the print job, and
converting, by the processor, the color data from the source color space to the destination color space using the neural network.

6. The method of claim 5, wherein the color conversion object comprises a lookup table that maps the input colors of the source color space to the output colors of the destination color space.

7. The method of claim 6, further comprising:
storing the lookup table in a memory; and
deleting the lookup table from the memory after training the neural network.

8. The method of claim 5, wherein converting the color data using the neural network comprises:
providing individual color values of the color data as input to the neural network, and
determining respective converted color values corresponding to the individual color values based on the weights associated with the two or more hidden layers of nodes.

9. A non-transitory computer-readable medium having stored therein instructions that are executable to cause a system to perform functions comprising:
obtaining a source profile associated with a print job;
obtaining a destination profile associated with the print job;
based on the source profile and the destination profile, generating a color conversion object that maps input colors of a source color space to output colors of a destination color space,
training a neural network using the color conversion object so as to obtain weights associated with two or more hidden layers of nodes of the neural network, where in the neural network comprises an input layer having a plurality of input nodes and an output layer having a plurality of output nodes, wherein input nodes of the plurality of input nodes correspond to respective components of the source color space, wherein output nodes of the plurality of output nodes correspond to respective components of the destination color space, and wherein training the neural network further comprises:
- obtaining an input color that is different from the input colors that the color conversion object maps to output colors, wherein the input layer further comprises control nodes that allow the neural network to select an interpolation scheme from among a plurality of interpolation schemes that include at least a linear interpolation scheme and a cubic interpolation scheme,
- determining an interpolated output color corresponding to the input color using interpolation according to the interpolation scheme specified by the control nodes, and
- training the neural network using a training set of data that includes the input color and corresponding interpolated output color;

receiving color data corresponding to pixels of the print job; and converting the color data from the source color space to the destination color space using the neural network.

10. The non-transitory computer-readable medium of claim 9, wherein the color conversion object comprises a lookup table that maps the input colors of the source color space to the output colors of the destination color space.

11. The non-transitory computer-readable medium of claim 10, wherein the functions further comprise:
- storing the lookup table in a memory; and
- deleting the lookup table from the memory after training the neural network.

12. The non-transitory computer-readable medium of claim 9, wherein
- converting the color data using the neural network comprises:
  - providing individual color values of the color data as input to the neural network, and
  - determining respective converted color values corresponding to the individual color values based on the weights associated with the two or more hidden layers of nodes.

* * * * *